Nov. 4, 1969  E. N. DEERING ET AL  3,476,024
APPARATUS FOR ERECTING CARTONS
Filed Aug. 24, 1967  9 Sheets-Sheet 1

INVENTORS
Wickliffe Jones
Edwin N. Deering
Wood, Herron & Evans
ATTORNEYS

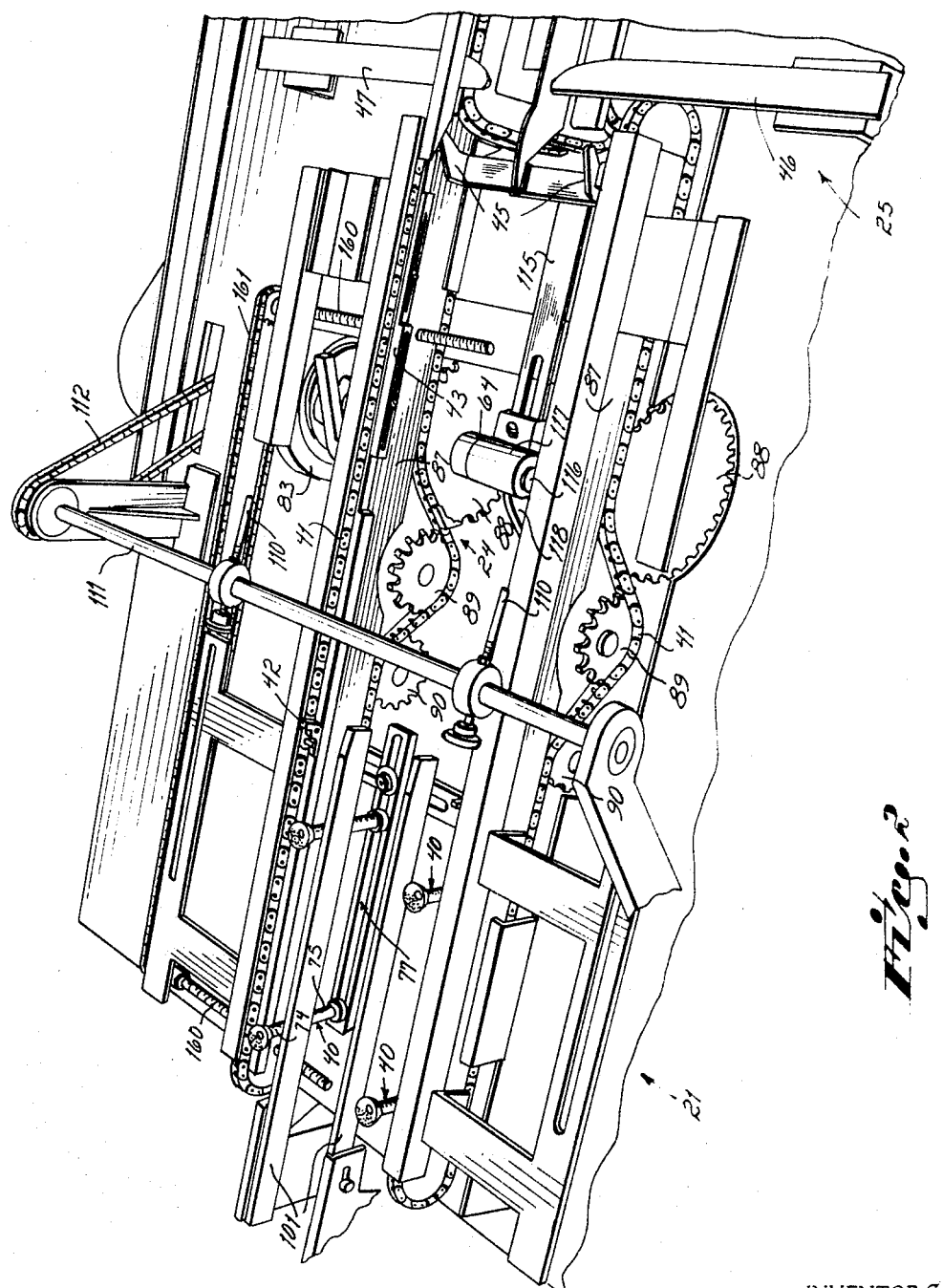

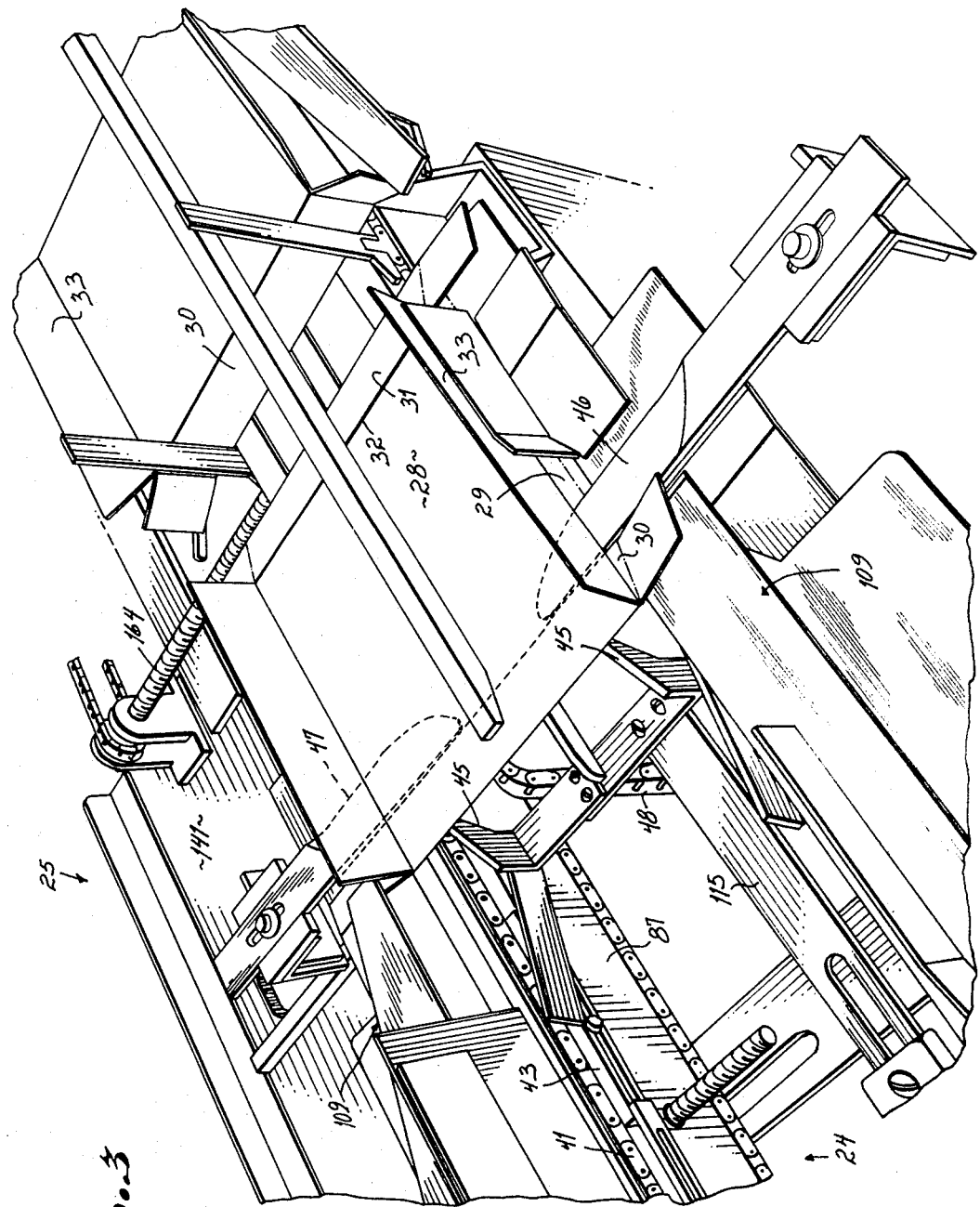

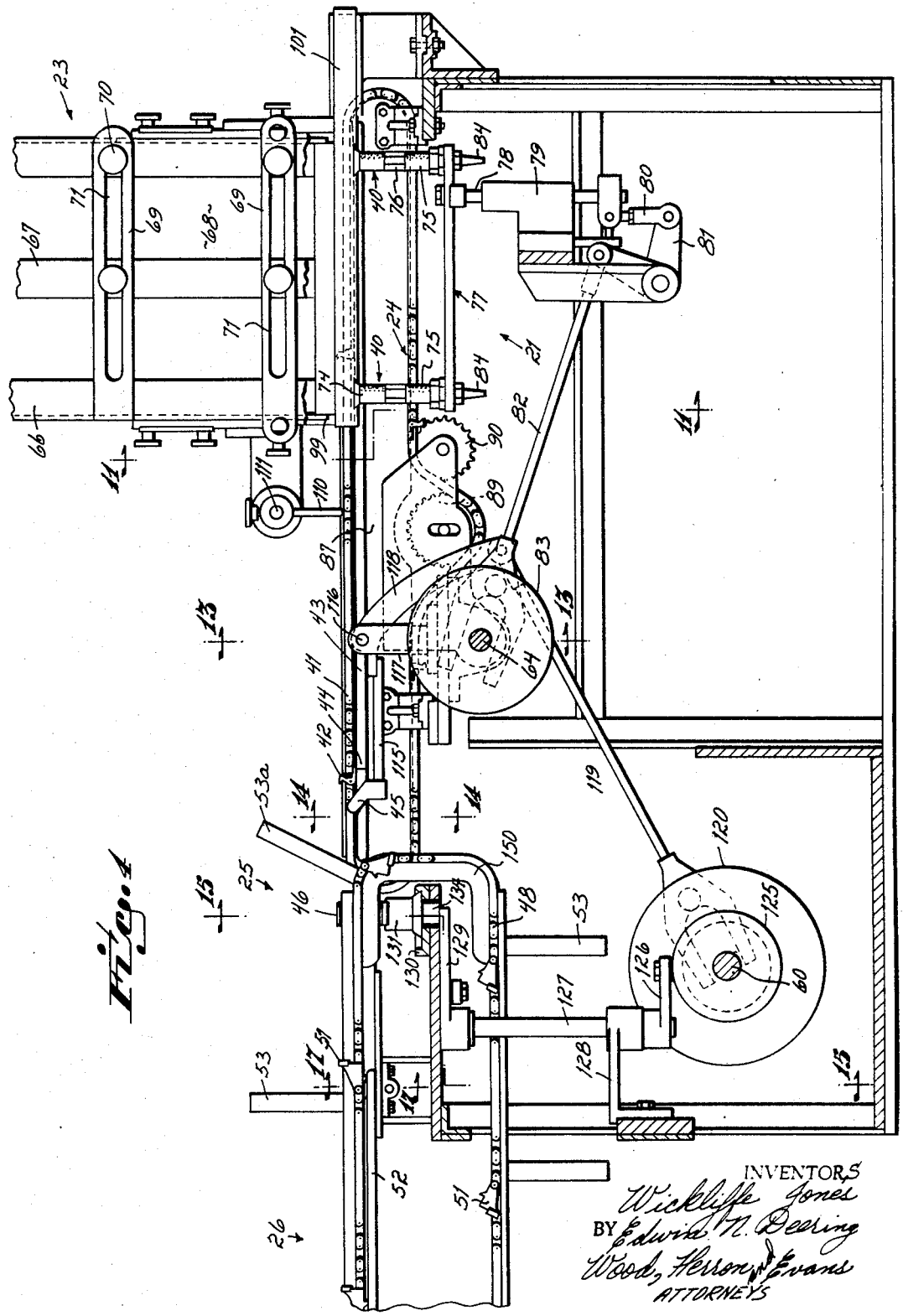

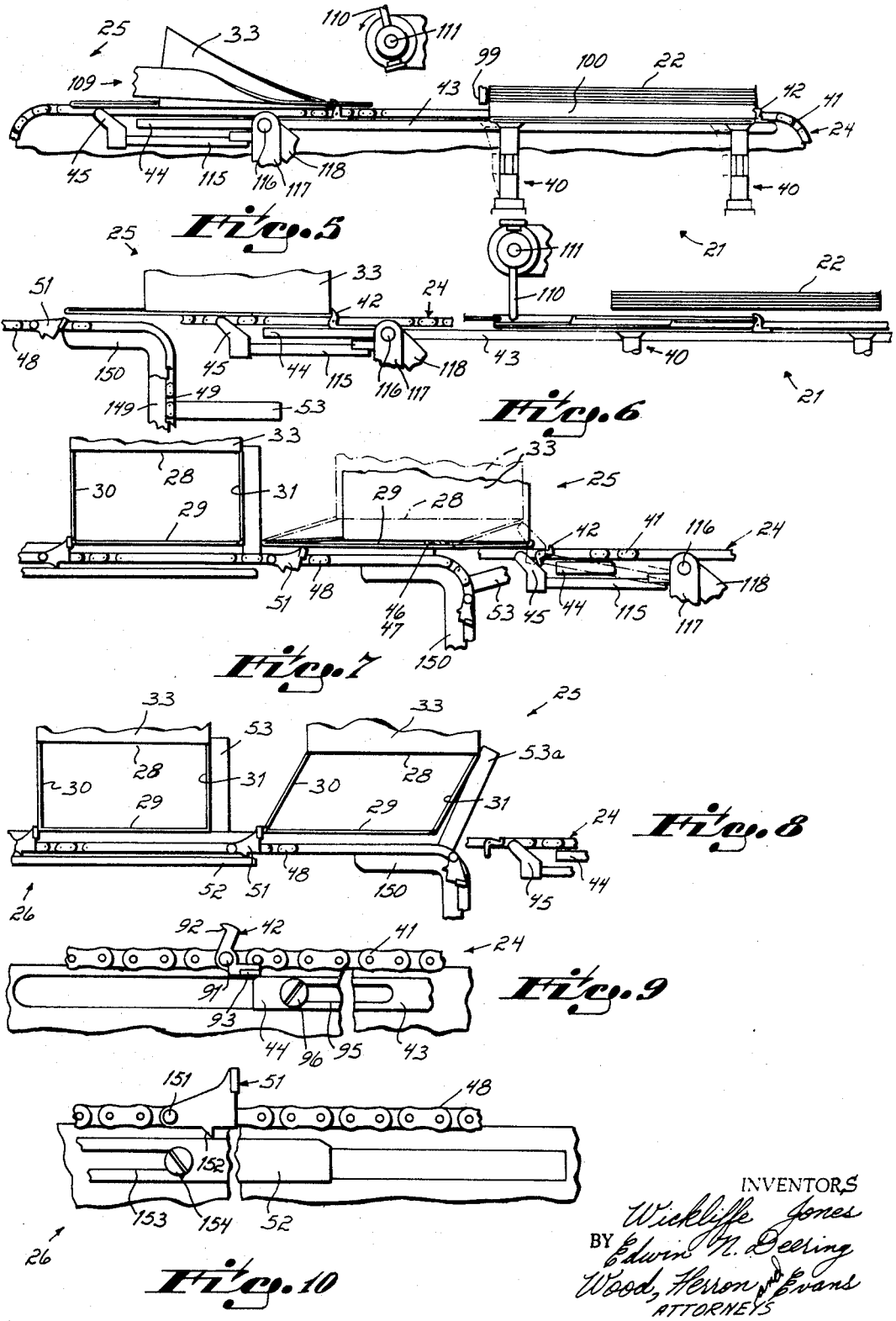

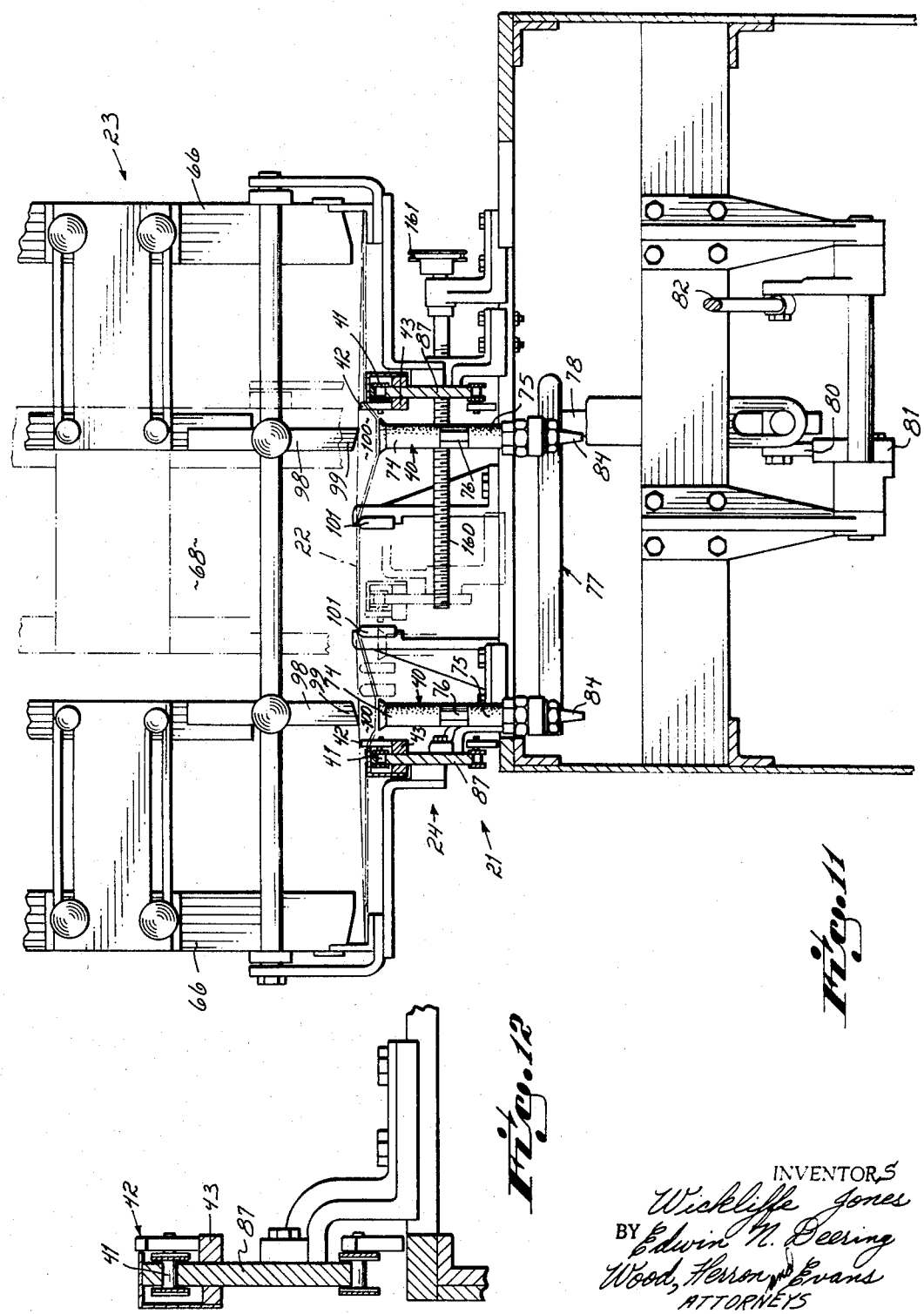

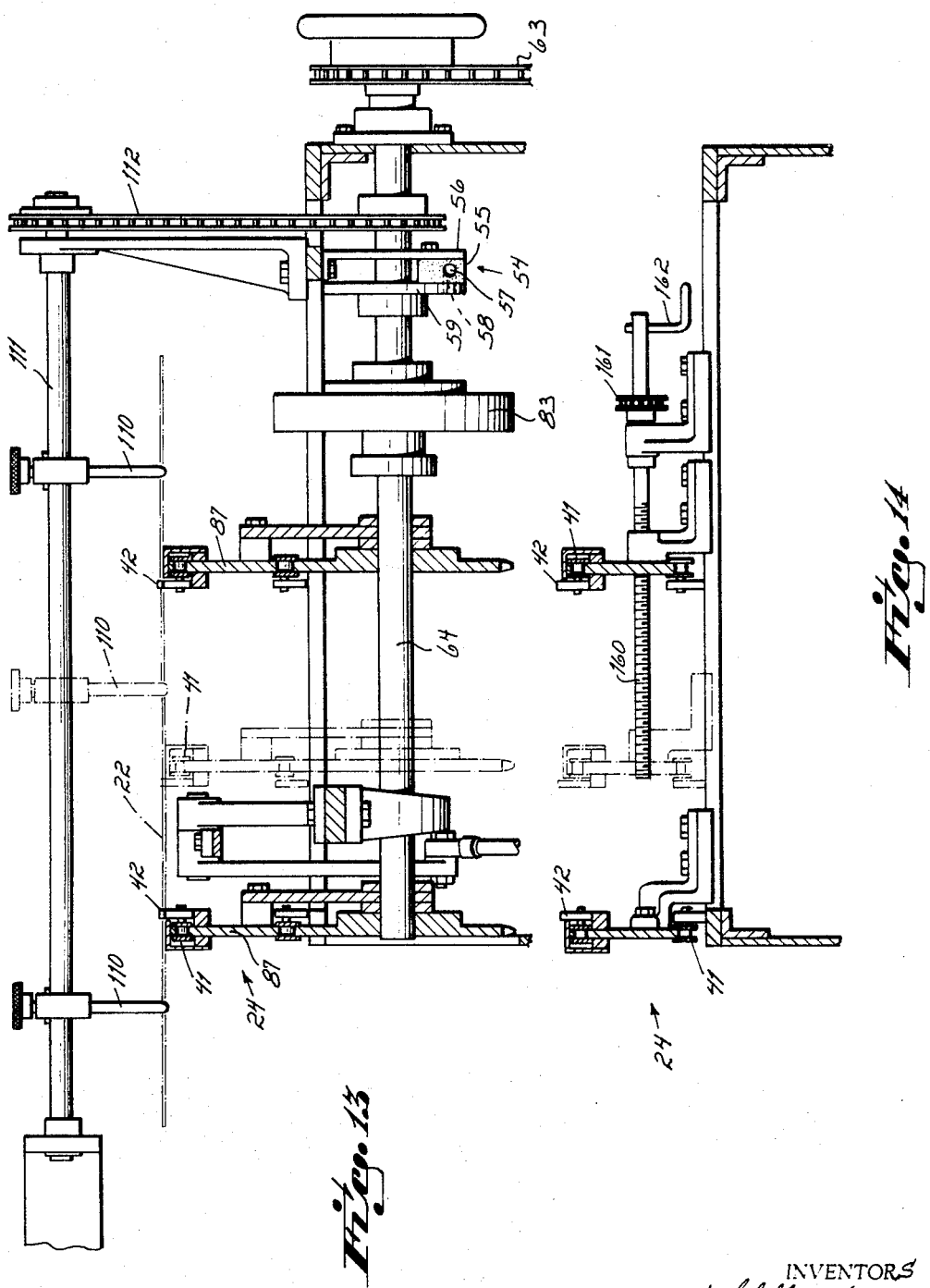

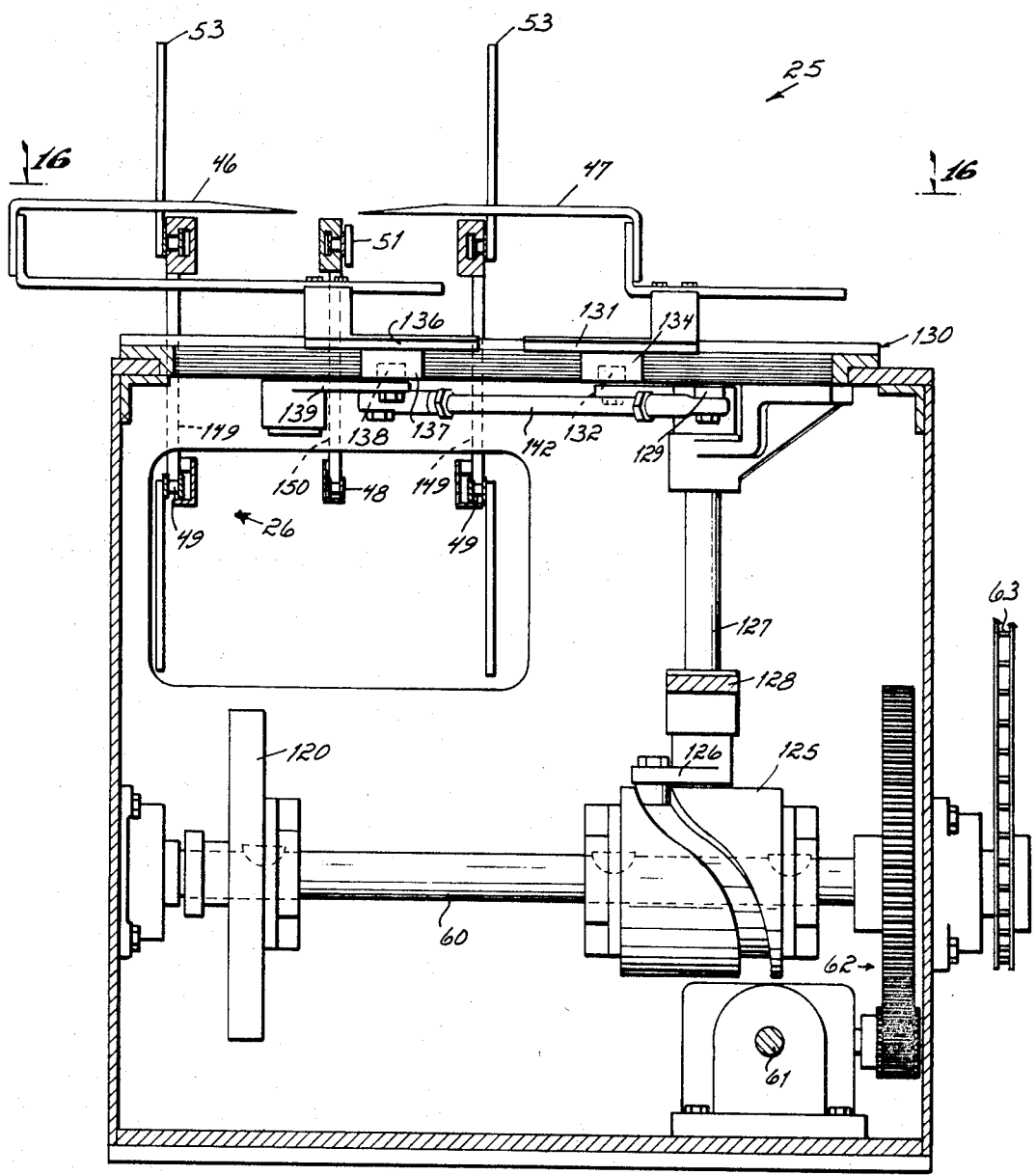

Nov. 4, 1969    E. N. DEERING ET AL    3,476,024
APPARATUS FOR ERECTING CARTONS
Filed Aug. 24, 1967      9 Sheets-Sheet
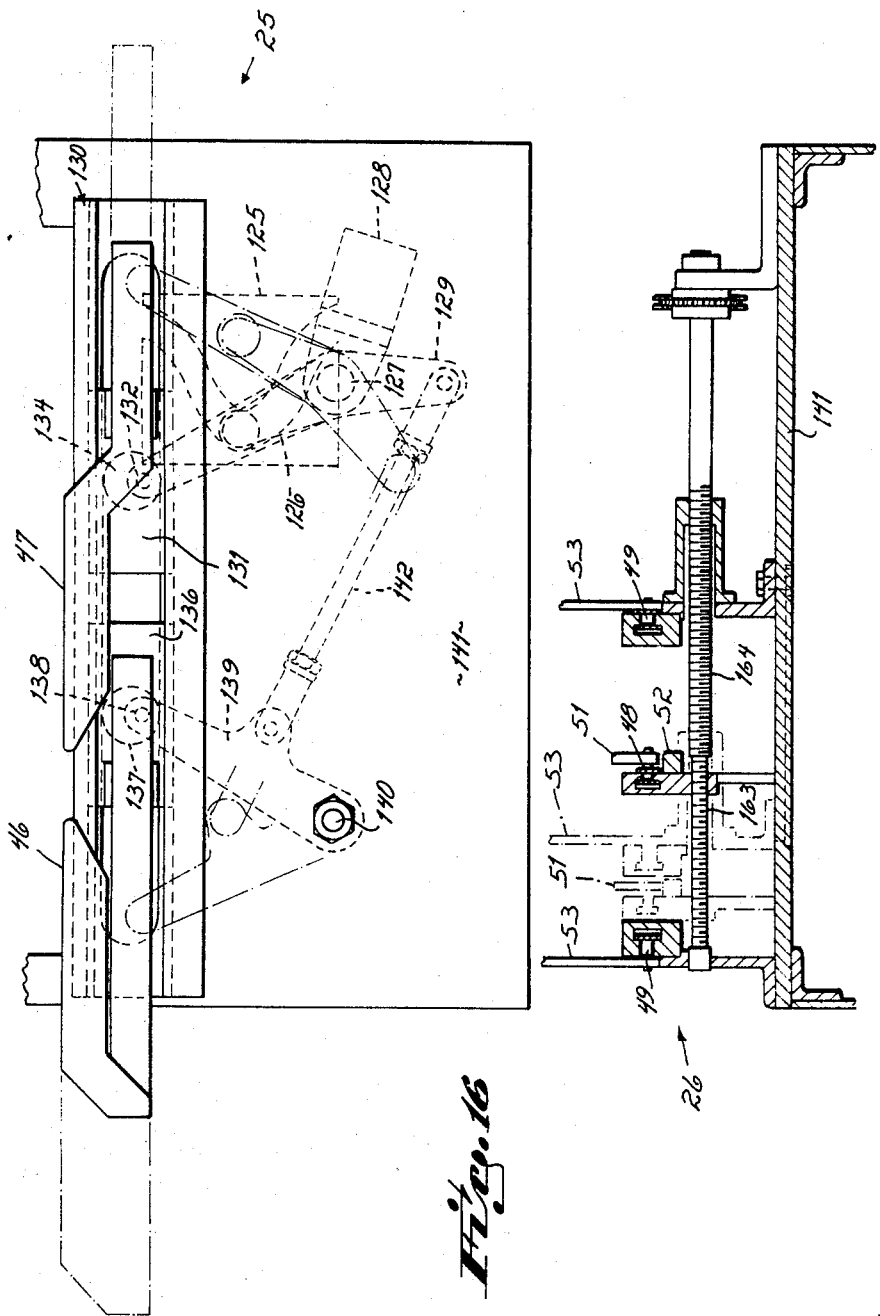
INVENTORS
Wickliffe Jones
Edwin N. Deering
Wood, Herron & Evans
ATTORNEYS

3,476,024
APPARATUS FOR ERECTING CARTONS
Edwin Naul Deering, Covington, Ky., and Wickliffe Jones, Cincinnati, Ohio, assignors to R. A. Jones and Company, Incorporated, Covington, Ky., a corporation of Kentucky
Filed Aug. 24, 1967, Ser. No. 662,978
Int. Cl. B31b 1/78
U.S. Cl. 93—53                              2 Claims

ABSTRACT OF THE DISCLOSURE

Apparatus which picks flat folded carton blanks one at a time from a magazine, conveys the blanks to an erecting station, erects the blanks to a tubular form at the erecting station, and conveys them downstream from the erecting station for further processing.

BACKGROUND OF THE INVENTION

Figure 1:
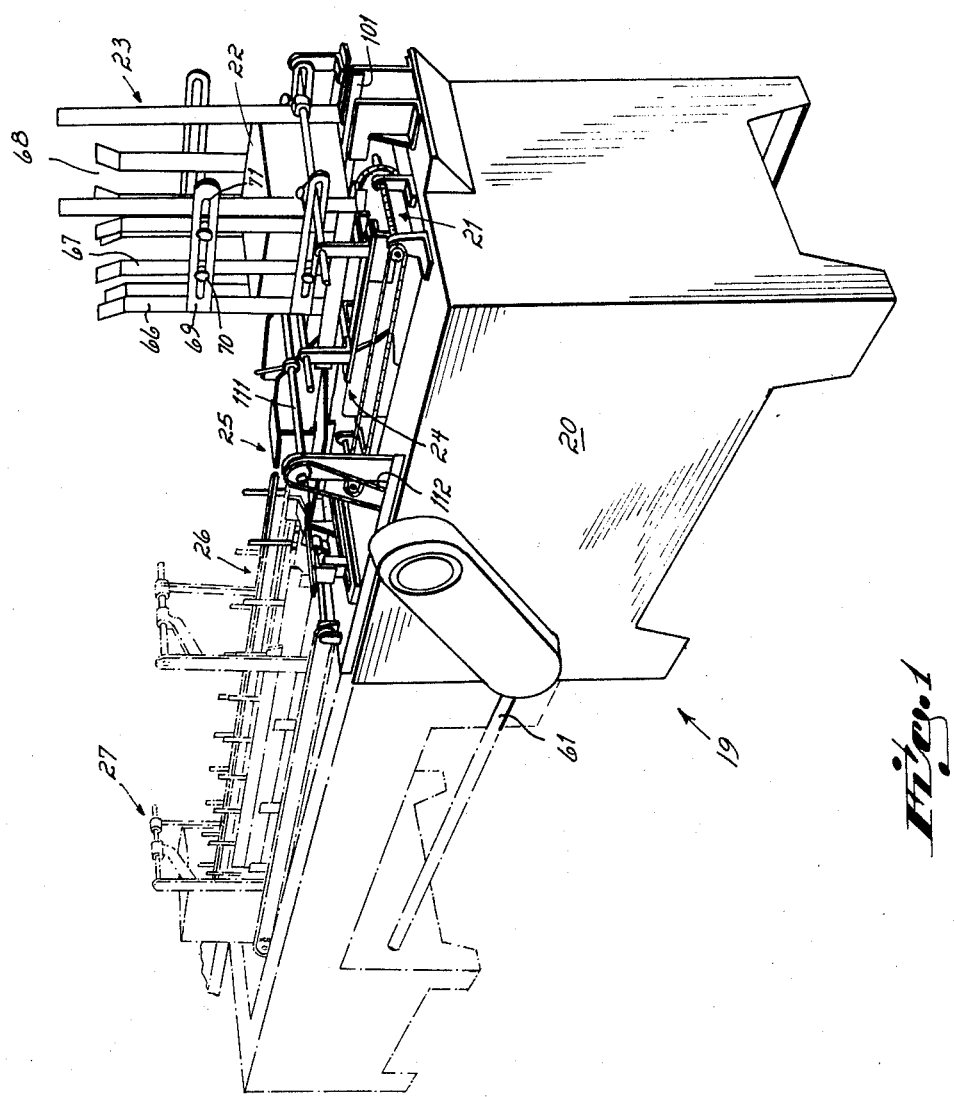

The invention is particularly directed to apparatus in which flat folded carton blanks are stacked in a magazine, are fed one at a time from the magazine and then conveyed to an erecting station. At the erecting station, the carton is erected and then captured between a leading transport lug mounted on its endless conveyor and a trailing transport lug mounted on another endless conveyor. The two endless conveyors carry the erected carton downstream from the erecting station for further processing, that is, loading, gluing and closing the carton.

The carton blank includes upper and lower major walls interconnected by leading and trailing side walls and is adapted to be erected to a tubular form with the axis of the tube oriented transversely of the machine direction.

Many machines of different types for erecting cartons are disclosed in prior patents. In one of the principal machines now enjoying widespread use, it has been the practice to convey such blanks with the leading side wall facing downwardly and the trailing side wall facing upwardly. At the erecting station, the upper major wall is supported while the trailing side wall is swung down, thereby forcing the bottom major wall and leading side wall down to erect the carton. Simultaneously, the leading transport lug is brought up into position to engage and hold the leading side wall in an erect position as the carton is conveyed downstream of the erecting station. The leading transport lug must project high enough to engage a substantial portion of the leading side wall for otherwise the resilience of the carton material would tend to cause the carton to collapse with the leading side wall sliding over the leading lug. However, as the leading lug is made higher, a greater space must be provided between adjacent cartons in order to provide a sufficient space, at least equal to the height of the lug, to permit the lug to swing up in front of the carton. This tends to impose a limitation on the size of the carton which can be economically handled in the machine for the larger the carton, the greater is the requirement of space between the cartons in order to accommodate a high lug for engaging and supporting the leading side wall.

SUMMARY OF THE INVENTION

The invention is also directed to apparatus for feeding the blanks from a stack to the erecting stations. It has been the practice to engage the undersurface of the cartons with suction cups which pull the carton blanks down. The carton blanks are then engaged at their rearward edges by a reciprocating knife which thrusts them forward out of the magazine.

An objective of the invention has been to provide an improved and simplified mechanism for feeding cartons from a magazine and further to provide a carton erecting mechanism which is suitable for use with large size cartons and which permits large size cartons to be erected with a minimum of space between the erected cartons.

In accordance with the invention, the feeding mechanism includes a suction cup which is freely supported on an elongated flexible stem. The suction cup can draw the carton blank downwardly out of the magazine and, with the vacuum maintained, stay with the carton as it is advanced a short distance out of the magazine as it is being stripped away from the cartons remaining in the magazine. Through the use of the flexible stemmed suction cup, in combination with an endless conveyor, the need for reciprocating knives to thrust the carton out of the magazine, as well as the complex mechanism for reciprocating the knives, is eliminated.

The cartons erected in the machine of the present invention are oriented oppositely to that of the existing machines described above. In accordance with the present invention, the cartons are advanced with the leading side wall facing upwardly and thus it is possible to use a transport lug which is required to be high enough only to engage the forward edge of the carton blank. Accordingly, at the erecting station, the invention provides a short forward transport lug mounted on an endless conveyor which passes under the erecting station, with means for projecting the lug upwardly just as the carton is being erected.

The carton is erected primarily by the rearward transport lug which is mounted on an endless conveyor and swings rapidly about a short radius into engagement with the downwardly facing trailing side wall of the carton blank.

It has been found that when certain types of carton blanks are struck rapidly by an erecting lug, there is a tendency for the flat blank simply to bow rather than to open. To accommodate such cartons, it is a further feature of the invention to provide for a preliminary erecting step as by a finger which initially and slowly engages the trailing side wall to start it in its pivotal erecting movement before the side wall is engaged by the rapidly swinging transport lugs.

It has been another objective of the invention to provide apparatus for feeding carton blanks and opening them as described above, the apparatus being adapted to be easily adjusted in order to accommodate cartons of various sizes.

The several features of the invention will become more readily apparent from the following detailed description taken in conjunction with the accompanying drawings in which:

FIG. 1 is a perspective view of the machine employing the invention,

FIG. 2 is a perspective view of the carton feeding and erecting stations with the magazine removed for clarity, FIG. 3 is a perspective view of the erecting station with a carton blank being shown at the beginning of the erecting operation, FIG. 4 is a side elevational view, partly in section, of the erecting station, FIGS. 5-8 are diagrammatic side elevational views illustrating the sequence of operations in erecting a carton, FIG. 9 is a fragmentary side elevational view of a conveyor lug for the feeding section, FIG. 10 is a fragmentary side elevational view of the forward transport lug, FIG. 11 is a cross sectional view taken along lines 11—11 of FIG. 3 illustrating the feeding section of the invention, FIG. 12 is an enlarged fragmentary cross sectional view illustrating the mounting of the endless conveyor at the feeding section, FIG. 13 is a cross sectional view taken along lines 13—13 of FIG. 3 illustrating the feed conveyor drive mechanism and the apparatus for adjusting it to accommodate cartons of varying sizes, FIG. 14 is a cross sectional view taken along lines 14—14 of FIG. 3 and illustrates the mechanism for adjusting the feed section conveyor for cartons of varying sizes, FIG. 15 is a cross sectional view taken along lines 15—15 of FIG. 3 illustrating the opening blades and the mechanism for operating them, FIG. 16 is a plan view taken in the direction of lines 16—16 of FIG. 15 further illustrating the opening blades and mechanism for operating them, and FIG. 17 is a cross sectional view taken along lines 17—17 of FIG. 3 illustrating the mechanism for varying the position of the transport conveyors to accommodate cartons of varying sizes.

In the following description, the term "machine direction" will refer to the direction of movement of the cartons as they are being erected and transported for further processing; the length of the carton is its dimension measured in the machine direction; the width of the carton is the dimension measured horizontally in the direction transverse of the machine direction; and the depth of the carton is the dimension measured vertically of the machine direction.

GENERAL ORGANIZATION

The apparatus is illustrated at 19 in the perspective view of FIG. 1. The apparatus which is supported on an elongated frame 20 includes a feeding section 21 where carton blanks 22 are stacked in a magazine 23 and are fed one at a time from the bottom of the stack in the machine direction. Downstream of the feeding section is a feed conveyor section 24 which may be as long as is necessary to perform any intermediate operations such as printing on the carton before it is erected. Downstream of the feed conveyor section is an erecting station 25 where the cartons are opened from flat folded blanks to tubular cartons open at each end. Downstream of the erecting station is a transport conveyor section 26 which carries the cartons to the area indicated at 27 for further processing including filling or loading, gluing and sealing.

As shown in FIG. 3, each carton blank 22 includes upper and lower major walls 28 and 29, a leading side wall 30, and a trailing side wall 31. The walls are defined by transverse score lines 32 and are connected together to form the generally tubular carton. Suitable flaps 33 are connected along score lines to the edges of the walls and are adapted to be glued and folded upon one another to close the carton after it has been erected and filled.

At the feeding section (FIGS. 2, 4, and 11), suction cups 40 are mounted below the magazine 23 for vertical movement. Two suction cups are located on each side of the machine and two laterally spaced feed conveyor chains 41 of the feed conveyor 24 pass between them. The feed conveyor chain 41 extends from the magazine 23 to the erecting station 25. Each chain carries a pivotally mounted conveyor lug 42 which normally rides on a lug cam 43 and which holds the conveyor lug in operative position (FIG. 9) until the lug passes over the downstream end of the cam indicated at 44.

At the erecting station 25 (FIGS. 2 and 3), an initial opening finger 45 is mounted for oscillatory motion and is adapted to engage the trailing side wall 31 of a carton blank to begin its pivotal movement in the erecting operation (FIG. 7). A pair of opening blades 46 and 47 are slidably mounted for transverse movement to project in and out of the tubular carton. The blades engage the carton, during the erecting movement, adjacent the score line 32 of the trailing wall 31 to hold the blank as the trailing wall is pivoted toward its vertical position.

A forward transport conveyor chain 48 passes under the erecting station. On each side of the chain 48 is a rearward transport conveyor chain 49 (see FIG. 15). The chains 48 and 49 carry lugs which are adapted to engage the forward and rearward ends of a carton respectively and convey it into the area 27 for further processing.

Referring to FIGS. 4 and 10, lugs 51 on the forward transport chain 48 are pivotally mounted and are engageable with a cam track 52 which causes the lugs to pivot upwardly into operative position as the carton is erected. Lugs 53 on the rear transport chain 49 are rigidly mounted perpendicular to the length of the chain. As each lug swings upwardly as indicated at 53a, it engages the trailing side wall of the carton and pivots it to its perpendicular position. Thus, each lug 53 combines the function of assisting in the erection of the carton and assisting in transporting the carton from the erecting station.

OPERATION

The operation generally is as follows, reference being made in part to FIGS. 5-8.

As shown in FIG. 5, the suction cups 40 engage the lowermost carton blank 22 and draw it down from the stack. The lugs 42 on feed conveyor chain 41 engage the blank and carry it forward toward the erecting station. During the conveying of the blank, plows, which will be described generally below, open the lateral side flaps 33 of the carton and the opening blades 46 and 47 are projected into the interior of the carton blank (FIG. 3). When the blank is conveyed to the position in which the rearward edges of the blades 46 and 47 coincide with the lower score line of the trailing wall 31, the conveyor lug 42 drops from its track 43 and the forward movement of the blank stops.

During the momentary dwell of the movement of the carton blank (FIGS. 6 and 7), the forward transport lug 51 of chain 48 passes under the carton until it engages the cam track 52 which pivots it upwardly into operative position. The rearward end of the cam track 52 is positioned so that the lug is pivoted to its operative position just as the erecting of the carton is completed. As the transport lug 51 is being positioned and prior to the removal of blades 46 and 47, the nudging finger 45 partially erects the carton blank by tapping the trailing wall (shown in phantom lines in FIG. 7).

After the carton has been partially erected, the rearward transport lug 53 swings through the position indicated at 53a (FIG. 8) during which it pivots the trailing wall 31 of the carton to a vertical position as the carton is held by the blades 46, 47. The blades are immediately withdrawn and the erected carton is carried by the transport conveyors whose lugs 51 and 53 engage the forward and rearward sides of the carton respectively out of the erecting station.

DRIVE SYSTEM

The drive for the apparatus including the feeder section is derived from a main drive shaft 60 which is in turn driven by a shaft 61 through gearing 62 (FIG. 15), the shaft 61 being driven from the downstream end of the machine.

A chain 63 (see also FIG. 13) transmits power from the shaft 60 to a second drive shaft 64 from which the drive to the operating elements of the feeder section is taken.

FEEDER SECTION

As stated above, the feeder section includes the magazine 23 which is fixed to the frame 20. The magazine includes vertical angle members 66 and vertical flat members 67 which define a rectangular chamber 68. The vertical members are interconnected by horizontal braces 69 through screws 70 passing through slots 71. The screw and slot interconnection permits the vertical members to be adjusted relative to each other in both longiudinal and transverse directions in order to accommodate different sizes of cartons.

Immediately below the magazine 23 are the four suction cups 40. Each cup is a flexible elastomer such as rubber which has an integral upper stem 74 which is flexible and has a lower stem 75 which is also flexible. The stems are interconnected by a metallic sleeve 76. The sleeve 76 maintains the necessary structural rigidity of the stem while the flexible upper and lower stems permit the cup to move forward a short distance while remaining in engagement with the carton blank (see FIG. 5).

The vacuum cups 40 are secured to a movable frame 77 which is fixed to a vertical rod 78 slidable in a bracket 79. The rod 78 is reciprocated through a linkage including a link 80, a bell crank lever, 81, and a rod 82 which is reciprocated by a cam 83 mounted on the drive shaft 64.

The cups 40 can be shifted with respect to the frame 77 longitudinally and transversely in order to accommodate carton blanks of varying sizes. Each cup has a spigot 84 by which it is connected to flexible tubing (not shown) through which the vacuum is applied to the cup.

The application and relief of the vacuum in the suction cups is timed by the mechanism as shown at 54 in FIG. 13. The vacuum is applied to a stationary block 55 mounted on a bracket 56 fixed to the frame. The block has a port 57 which connects it directly to a header (not shown) which distributes the vacuum to the four suction cups. Intermediate the ends of the port 57 is an exhaust port 58 which is normally covered by a disc 59 fixed to the drive shaft 64. The disc has a transverse slot which is alignable with the exhaust port 58 once during each revolution of the shaft. The vacuum remains applied to the suction cups during the major portion of each cycle, but at the instant that the feed conveyor chains have thrust the blanks out of the magazine, the exhaust port 58 of the port block 57 is connected to atmosphere via the aligned slot in disc 59 and the vacuum is relieved.

The feeder section 21 also includes the upstream end of the conveyor chain 41. The chain 41 is mounted on a track 87 and passes over a drive sprocket 88 fixed to drive shaft 64 (FIGS. 2 and 13) and around idler sprockets 89 and 90. Each chain carries a plurality of the conveyor lugs 42 which are pivoted at 91 to a chain link. Each lug, as shown in FIG. 9, includes a carton engaging hook 92 and a follower 93, the follower 93 riding on the cam track 43 which holds the hook 92 in its upper operative position. As shown in FIG. 9, the cam track 43 is longitudinally adjustable by the slot 95 and screw 96 connection so as to permit adjustment in the instant that the hook 92 drops away from engagement of the carton.

A pair of stripper fingers 98 (FIG. 11) are mounted in the front of the magazine 23 and have lower extremities indicated at 99 projecting just below the lowermost carton in the stack. The stripper fingers are aligned with the suction cups so that as the suction cups draw a carton down, two intermediate portions of the carton indicated at 100 drop below the stripper fingers. Horizontal adjustment of the stripper fingers is provided to permit them to be positioned immediately above the suction cups 40 when the suction cups are moved transversely to accommodate cartons of different widths.

A pair of rails 101 extend longitudinally from beneath the magazine to a position a few inches downstream of the magazine to provide support for the cartons stacked within the magazine as well as support for the carbon blank as it is fed from the magazine.

The cooperation of the elements is such that the suction cups 40 engage the lowermost blank and pull the intermediate portions 100 down below the level of the stripper fingers 98. While held in this position, the hook 92 of the lug 42 on each conveyor chain engages the carton and begins to convey it out of the magazine. During the initial fraction of an inch of travel, the vacuum remains applied to the suction cups and the suction cups stay with the carton until it clears the stripper fingers. As indicated above, the suction cup is permitted to move with the carton by the elongated flexible stem.

THE ERECTING STATION

As indicated in the description of the general organization, the cartons are opened in part by the projection of the opening blades 46 and 47 transversely into the cartons. To provide assurance that the blades will project into the carton, it is common practice to depress one of the lateral end flaps 33 and to permit plows to bend the end flaps away from each other, thereby providing a flaring entrance to the ends of the carton. To this end, flap engaging fingers 110 are rotatably mounted on a shaft 111 and are radially adjustable with respect to the shaft. The shaft is rotated by a chain 112 which is driven from the drive shaft 64 as shown in FIG. 13. The plows have not been shown in FIG. 4 for the sake of clarity but are illustrated in FIG. 3. These plows indicated at 109 project between the lower depressed flap and the upper flap and cause the flaps to spread away from each other to permit the introduction of the opening blades 46 and 47. In the present invention which is particularly useful in erecting large cartons, it is preferable that the plows swing the end flaps 33 hinged to the upper major wall 28 to a substantially vertical attitude for in the vertical attitude it braces the major wall 28 against bowing and thus facilitates the erecting operation.

The initial opening finger 45 is mounted on an arm 115 which forms one arm of a bell crank lever pivoted at 116 to a fixed bracket 117. The other arm 118 of the bell crank lever is connected to a rod 119. The end of the rod 119 is a cam follower which engages a track in the cam 120. The cam 120 is fixed to and rotates with the drive shaft 60. As the drive shaft 60 rotates, the finger 45 pivots up and down to engage the trailing side wall of the carton to initiate the erecting operation.

The opening blades 46 and 47 are illustrated in FIGS. 3, 15, and 16. Both knives are driven by a barrel cam 125 having a cam track which is followed by the arm 126 fixed to a vertical shaft 127 journalled in a bracket 128. At the upper end of the shaft 127 is a crank arm 129 which operates both blades. The blades 46 and 47 are slidably mounted on ways 130. The blade 47 is mounted on a block 131 which slides in the ways 130 and is pivotally connected at 132 to one end of the arm 129. The pivot 132 is eccentrically mounted with respect to a bearing 134 which is rotatable in the block 131. Thus, oscillation of the vertical rod 127 causes the reciprocation of the blade 47. The blade 46 is similarly mounted and actuated. The blade is connected to a block 136 which is slidable in the ways 130, the block carrying a rotatable bearing 137. The bearing 137 is connected to an eccentric pivot pin 138 which is connected to a lever arm 139 pivoted at 140 to a plate 141 forming a part of the frame. A rod 142 connects the lever arms 139 to the arm 129. Again, the oscillation of the vertical rod 127 causes the reciprocation of the blade 46, the two blades moving toward and away from each other in timed relation with the movement of the cartons into the erecting station. The blades begin movement into the carton as the leading edge of the carton passes by the blades. The blades reach their operative positions for erecting the carton, that is, a position adjacent the score line of the trailing side wall, just as the finger 45 begins its upward pivotal movement to pivot the trailing side wall of the carton in an upward direction. The blades engage the inside surface of the major wall to brace it as the trailing side wall is pivoted to a vertical position.

At its upstream end, the forward transport conveyor chain passes around a U-shaped track 150 which is fixed to the frame. The chain is driven by a sprocket system (not shown) similar to that employed for the feed conveyor chain 41 downstream of the erecting station and the chain is supported by suitable track, not shown. A plurality of forward transport lugs 51 are pivoted at 151 to the chain in uniformly spaced relation. Each lug has a foot 152 (see FIG. 10) which is adapted to ride on the cam track 52. The cam track 52 is secured through a longitudinal slot 153 and screws 154 to the frame and is longitudinally adjustable in order to select and adjust the precise position at which the lug is caused by the track to pop up to operative position. As indicated above, in the normal operation of the invention, the lug passes under a carton during its dwell at the erection station and is popped up immediately adjacent its leading edge at the instant of the erection of the carton.

The rearward transport conveyor chains 49 are mounted and driven in a manner similar to that of the forward transport chain 48. Each chain passes over a U-shaped chain track 149 identical to the track 150. The radius of the track 149 at its upper corner is very short so that the lug 53 which is carried by the chain 49 swings as indicated at 53a from a horizontal attitude to a vertical attitude very rapidly. In the apparatus as illustrated, the movement from horizontal to vertical is effected in 3/16 of a cycle. By swinging the rear transport lug 53 in such a rapid manner, the distance between adjacent cartons can be kept to a minimum. It is, however, the rapid swinging of the rearward transport lug which tends to cause the larger cartons to bow rather than to erect to the tubular configuration. It is for this reason that the supplemental erecting finger 45 is used to effect the more gradual opening of the carton before the trailing side wall is struck by the rear transport lug 53.

ADJUSTING FOR CHANGES IN CARTON DIMENSION

There are three dimensions of the carton which can be changed and each change requires a different adjustment. The three dimensions will be referred to as the length, which is the dimension in the machine direction, the width, which is the horizontal dimension perpendicular to the machine direction, and the depth, which is the vertical dimension when the carton is erected.

To adjust the machine for a carton of greater length, the length of the magazine receiving the blanks must be changed. The downstream vertical wall is moved in a forward direction to accommodate the increased length of the carton. The only other changes of significance which are required are the shifting of the forward transport chain 48 and the longitudinal position of the cam track 52 to increase the space between the forward transport lug 51 and the rearward transport lug 53 as well as the instant at which the lug 51 is projected into operative position.

If the depth of the carton is increased without a change in the length of the carton, the magazine in which the blanks are contained is changed in the manner described above for an increase in the depth obviously increases the overall length of the blank. An increase in the depth of the carton also increases the distance between the trailing edge of the blank and the score line about which the trailing side wall is folded. It is critically important that that score line be brought to the erection station at precisely the same instant in relation to the movement of the opening blades and the rearward transport lug regardless of the carton size. Therefore, to accommodate the increase in depth, the feeder conveyor must be shifted in order to move in a rearward direction the relative position of the feeder lugs 42. Similarly, the timing of the suction cups 40 must be changed. Both of these changes are made simply by rotating the drive shaft 64 with respect to its drive chain 63, thereby changing the angular relationship of the drive shaft 64 to the drive shaft 60 which operates the opening blades.

A change in the width of the carton does not require any adjustment of the timing relationships of the operating parts. Rather, the adjustment for width is simply a spatial adjustment to accommodate the different sizes of the cartons. The transverse spacing of the suction cups might have to be changed and, of course, the transverse dimension of the magazine has to be changed. The spacing of the conveyor chains is effected by moving their tracks transversely. The track 87 for the feeder conveyor chain is adjusted laterally by rotating a pair of screws 160 which are interconnected by chains 161 through a removable crank handle 162 (see FIGS. 2 and 14). The transport chains are shifted laterally in a similar manner as illustrated in FIG. 17. In order to maintain the feeder chain 48 spaced equidistant from the outside rearward chains 49, the track for the feeder chain is shifted at half the rate of the outside chain 49. This is accomplished by the telescope screws 163 and 164 which are connected to the tracks 150 and 149, respectively.

What is claimed is:

1. A machine for erecting to a tubular form a carton blank having upper and lower major walls connected by score lines to leading and trailing side walls, comprising,
   a frame,
   an erecting station on said frame,
   means on said frame for conveying flat folded carton blanks to said erecting station horizontally, with said trailing side wall facing downwardly,
   an endless rearward transport conveyor chain having at least a portion of its upper flight passing under said erecting station, said conveyor having a plurality of spaced lugs projecting perpendicularly from said chain and engageable with the trailing side wall of said carton to convey said carton downstream from said erecting station,
   an endless forward transport conveyor chain having at least a portion of its upper flight passing under said erecting station,
   a plurality of spaced forward lugs pivotally mounted on said forward conveyor,
   cam means downstream of said erecting station engageable by said forward lugs to move said forward lugs upwardly into operative position, thereby permitting said lugs to pass under a carton blank and to be moved into operative position upon erection of said blank,
   means for varying the longitudinal position of said chains with respect to each other to permit adjustment of the longitudinal spacing of said forward and rearward lugs,
   means for driving said conveyors at the same lineal speeds,
   said forward lugs being substantially shorter than said rearward lugs and spaced downstream of said rearward lugs a distance equal to the length of a major wall, whereby said cartons, when erected, are captured between adjacent forward and rearward lugs and conveyed from said erecting station,
   a blade mounted for transverse reciprocation adjacent said erecting station, means for momentarily projecting said blade into a carton to a position overlying the lower major wall adjacent the trailing side wall, an erecting finger engageable with said trailing side wall, means for operating said erecting finger to bring it into engagement with said trailing side wall to begin the erection of the carton prior to the engagement of the trailing side wall by said rearward lugs.

2. Apparatus according to claim 1 in which said rearward lug, at the erecting station, is swung from a horizontal attitude to a vertical attitude in approximately 3/16 of a cycle.

References Cited
UNITED STATES PATENTS

| | | |
|---|---|---|
| 3,040,634 | 6/1962 | Galloway _____ 93—53 |
| 3,057,267 | 10/1962 | Johnson _____ 93—53 |
| 3,107,588 | 10/1963 | Lobdell et al. _____ 93—53 |
| 3,058,271 | 10/1962 | McGihon. |

BERNARD STICKNEY, Primary Examiner